United States Patent
Komoto

(12) 
(10) Patent No.: US 6,273,818 B1
(45) Date of Patent: Aug. 14, 2001

(54) VIDEO GAME APPARATUS AND METHOD AND STORAGE MEDIUM

(75) Inventor: Nobuaki Komoto, Honolulu, HI (US)

(73) Assignee: Square Co., Ltd., Tokyo (JP)

( * ) Notice: Subject to any disclaimer, the term of this patent is extended or adjusted under 35 U.S.C. 154(b) by 0 days.

(21) Appl. No.: 09/426,196

(22) Filed: Oct. 25, 1999

(51) Int. Cl.[7] ................................................. A63F 13/00
(52) U.S. Cl. .................................. 463/31; 463/8; 463/43
(58) Field of Search .................................. 463/43, 44, 45, 463/30–36, 7, 8; 345/419, 421–427, 440–443, 113–116, 118, 126–127

(56) References Cited

U.S. PATENT DOCUMENTS

| | | | | |
|---|---|---|---|---|
| 5,390,937 | * | 2/1995 | Sakaguchi et al. | 463/44 |
| 5,649,861 | * | 7/1997 | Okana et al. | 463/30 |
| 5,649,862 | * | 7/1997 | Sakaguchi et al. | 463/44 |
| 5,807,174 | * | 9/1998 | Fukuhara et al. | 463/31 |
| 5,863,248 | * | 1/1999 | Mine et al. | 463/31 |
| 6,001,017 | * | 12/1999 | Okano et al. | 463/43 |
| 6,093,105 | * | 7/2000 | Morihira | 463/31 |
| 6,102,801 | * | 8/2000 | Sugawara | 463/31 |
| 6,165,073 | * | 12/2000 | Miyamoto et al. | 463/32 |
| 6,196,919 | * | 3/2001 | Okubo | 463/32 |
| 6,217,446 | * | 4/2001 | Sanbongi et al. | 463/8 |

OTHER PUBLICATIONS

Gerstmann, Jeff, *Darklight Conflict Review* Game Spot VG, Jul. 1997.*

Robert Brady "DOOM" Unauthorized Tips and Secrets Brady Games pp. 1–4 and 22–29 and 32–57, Dec. 1994.*

* cited by examiner

*Primary Examiner*—Michael O'Neill
(74) *Attorney, Agent, or Firm*—Greenblum & Bernstein, P.L.C.

(57) ABSTRACT

When a player designates a magic attack, it is judged whether a player character possesses an "area" item corresponding to the designated magic attack. Depending on whether the player character possesses such an "area" item, a designation manner of one or more enemy characters is changed between a single enemy designation mode and an area designation mode. In the area designation mode, an attack area is set based on attack area data (shape and size of attack area) prestored corresponding to each of magic attacks selectable by the player. Then, one or more enemy characters located in the attack area are designated as one or more attack targets. The attack area can be moved in accordance with an operation inputted by the player.

20 Claims, 10 Drawing Sheets

FIG.3

| | | | |
|---|---|---|---|
| COORDINATE DATA OF PLAYER CHARACTER | | | $P_0(X_0,Y_0,Z_0)$ |
| DISPLAYED ENEMY CHARACTER DATA | 1 | ENEMY CHARACTER NAME | BOM |
| | | COORDINATE DATA | $P_1(X_1,Y_1,Z_1)$ |
| | 2 | ENEMY CHARACTER NAME | GOBLIN |
| | | COORDINATE DATA | $P_2(X_2,Y_2,Z_2)$ |
| | ⋮ | ⋮ | ⋮ |
| POSSESSED "AREA" ITEM | | | FIREBALL |
| | | | BLIZZARD STORM |
| | | | THUNDER CROSS |
| | | | DRAIN UP |
| | | | ⋮ |
| ⋮ | | | ⋮ |

- 20a: COORDINATE DATA OF PLAYER CHARACTER
- 20b: DISPLAYED ENEMY CHARACTER DATA
- 20c: POSSESSED "AREA" ITEM
- 20

| MAGIC (21a) | "AREA" ITEM (21b) | ATTACK AREA DATA (21c) ||
|---|---|---|---|
| | | SHAPE | SIZE |
| FIRE | FIREBALL | SQUARE | (3 × 3) |
| AERO | AERO ALL | SQUARE | WHOLE DISPLAY AREA |
| BLIZZARD | BLIZZARD STORM | TRIANGLE | (5 × 3) |
| THUNDER | THUNDER CROSS | CROSS | (5 × 5) |

VIDEO GAME APPARATUS AND METHOD AND STORAGE MEDIUM

BACKGROUND OF THE INVENTION

1. Field of the Invention

The present invention relates to a video game, and more particularly, to a technique for designating one or more enemy characters to be attacked.

2. Description of the Related Art

There are various kinds of video games. In some of them, a player character operated by a player and enemy characters controlled by a computer fight a baffle.

In the video games where the battle between the player character and the enemy characters is controlled, processing is required for designating, among the enemy characters in the battle, one or more enemy characters to be attacked next by the player character in accordance with predetermined factors.

For designating an enemy character to be attacked, there are available, for example, such methods, wherein an enemy character to be attacked is designated among enemy characters depending on an operation inputted by a player, and wherein an attack area of fixed shape and size representing a range where an attack by a player character is effective is displayed so that one or more enemy characters located in the displayed attack area are designated as attack targets.

Then, processing, such as calculating damages caused by attacks and producing images and sounds, is executed for the battle between the player character and one or more designated enemy characters. The enemy character designation among the enemy characters for the next attack is an important strategic factor for the battle.

For enhancing the attractiveness of the video games wherein a battle between a player character and enemy characters is controlled, it is desirable to improve a designation manner of one or more enemy characters to be attacked.

SUMMARY OF THE INVENTION

Therefore, it is an object of the present invention to provide a video game wherein a designation manner of one or more enemy characters to be attacked is changed depending on whether a player character possesses a predetermined item.

According to one aspect of the present invention, there is provided a video game apparatus for playing a video game wherein a battle is made between a first and a second character, the apparatus comprising storage means for storing an item and an attack area corresponding to each of attacks executable by the first character; detecting means for, when one of the attacks is designated in response to an operation inputted by a player, detecting whether the first character possesses one of the items which is stored in the storage means so as to correspond to the designated attack; area displaying means for, when the detecting means detects that the first character possesses one of the items, displaying one of the attack areas which is stored in the storage means so as to correspond to the designated attack; and attack allowing means for allowing the first character to attack the second character when the second character is located in the one of the attack areas displayed by the area displaying means.

In the foregoing video game apparatus, when an attack is designated during a battle between characters, it is detected whether a predetermined character possesses an item corresponding to the designated attack. If such an item is possessed, an attack area corresponding to the designated attack is displayed so that the predetermined character is allowed to attack one or more characters located in the displayed attack area. Thus, depending on whether the predetermined character possesses an item corresponding to a designated attack, an attack area may be displayed or may not be displayed. This enhances the attractiveness of the game.

Further, an attack area to be displayed differs corresponding to a designated attack. Accordingly, an area where an attack is allowed differs depending on a kind of attack. This also enhances the attractiveness of the game.

In the foregoing video game apparatus, it may be arranged that the area displaying means moves a display position of the one of the attack areas In response to an operation inputted by the player.

In this case, one or more characters located in a displayed attack area can be changed by moving a display position thereof.

Thus, designation of one or more characters to be attacked can be easily changed.

According to another aspect of the present invention, there is provided a video game apparatus for playing a video game wherein a battle is made between characters, the apparatus comprising means for displaying an image showing a battle state between the characters in response to an operation inputted by a player; means for displaying an attack area on the displayed image; means for moving the attack area following a predetermined rule in response to an operation inputted by the player; means for, when at least one of the characters is located in the attack area, changing a display manner of the at least one of the characters; and means for specifiying as an attack target the at least one of the characters whose display manner is changed.

In this video game apparatus, when an attack area is moved so that a character is located in the attack area, a display manner of the character is changed. Thus, a character to be attacked is made clear visually.

According to another aspect of the present invention, there is provided a method of playing a video game wherein a battle is made between a first and a second character, the method comprising a detecting step for, when an attack to be made by the first character is designated in response to an operation inputted by a player, detecting whether the first character possesses an item which is stored in advance corresponding to the designated attack; an area displaying step for, when the detecting step detects that the first character possesses the item, displaying an attack area which is stored in advance corresponding to the designated attack; and an attack allowing step for allowing the first character to attack the second character when the second character is located in the attack area displayed at the area displaying step.

In the foregoing method, it may be arranged that the area displaying step moves a display position of the attack area in response to an operation inputted by the player.

According to another aspect of the present invention, there is provided a method of playing a video game wherein a battle is made between characters, the method comprising a step for displaying an image showing a battle state between the characters in response to an operation inputted by a player; a step for displaying an attack area on the displayed image; a step for moving the attack area following a predetermined rule in response to an operation inputted by the player; a step for, when at least one of the characters is located in the attack area, changing a display manner of the at least one of the characters; and a step for specifiying as an attack target the at least one of the characters whose display manner is changed.

By using a computer to execute the foregoing steps, the same effects can be achieved as those achieved by the foregoing video game apparatus.

According to another aspect of the present invention, there is provided a computer-readable storage medium storing a program for causing a computer to execute a video game wherein a battle is made between a first and a second character, the program comprising a detecting step for, when an attack to be made by the first character is designated in response to an operation inputted by a player, detecting whether the first character possesses an item which is stored in advance corresponding to the designated attack; an area displaying step for, when the detecting step detects that the first character possesses the item, displaying an attack area which is stored in advance corresponding to the designated attack; and an attack allowing step for allowing the first character to attack the second character when the second character is located in the attack area displayed at the area displaying step.

In the foregoing computer-readable storage medium, it may be arranged that the area displaying step moves a display position of the attack area in response to an operation inputted by the player.

According to another aspect of the present invention, there is provided a computer-readable storage medium storing a program for causing a computer to execute a video game wherein a battle is made between characters, the program comprising a step for displaying an image showing a battle state between the characters in response to an operation inputted by a player; a step for displaying an attack area on the displayed image; a step for moving the attack area following a predetermined rule in response to an operation inputted by the player; a step for, when at least one of the characters is located in the attack area, changing a display manner of the at least one of the characters; and a step for specifying as an attack target the at least one of the characters whose display manner is changed.

By causing the computer to read the program stored in the storage medium, the foregoing video game apparatus can be realized. Accordingly, the storage medium can be distributed and sold as a software product independently of the hardware.

The foregoing program may be embodied in a carrier wave as a computer data signal, so as to be electronically distributed and sold via a network or the like as a software product independently of the hardware.

Specifically, the computer data signal is embodied in a carrier wave and includes a program for causing a computer to execute a video game wherein a battle is made between a first and a second character, the computer data signal comprising a detecting step for, when an attack to be made by the first character is designated in response to an operation inputted by a player, detecting whether the first character possesses an item which is stored in advance corresponding to the designated attack; an area displaying step for, when the detecting step detects that the first character possesses the item, displaying an attack area which is stored in advance corresponding to the designated attack; and an attack allowing step for allowing the first character to attack the second character when the second character is located in the attack area displayed at the area displaying step.

BRIEF DESCRIPTION OF THE DRAWINGS

The present invention will be understood more fully from the detailed description given hereinbelow, taken in conjunction with the accompanying drawings In the drawings:

FIG. 3 is a schematic view of a battle control table stored in an associated data storage area of the RAM shown in FIG. 1;

DESCRIPTION OF THE PREFERRED EMBODIMENT

Now, a preferred embodiment of the present invention will be described hereinbelow with reference to the accompanying drawings. In this embodiment, the present invention is applied to a home-use video game apparatus. However, the present invention is not limited to the home-use video game apparatus.

Figure 1:
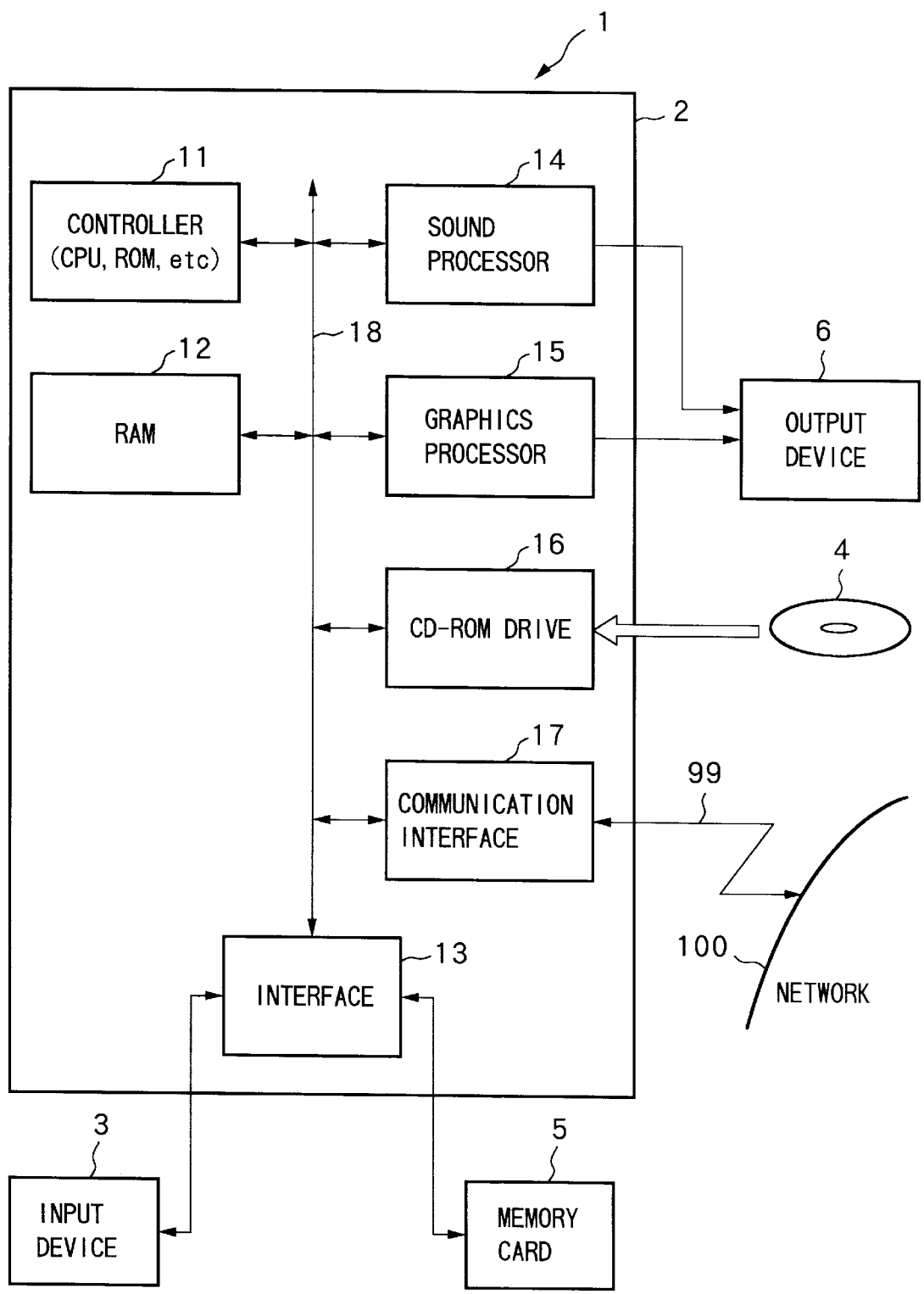
FIG. 1 is a block diagram showing the whole configuration of a video game apparatus to which the present invention is applied.

FIG. 1 is a block diagram showing a configuration of a video game apparatus 1 according to the preferred embodiment of the present invention. As shown in FIG. 1, the video game apparatus 1 comprises a body 2, an input device 3, a memory card 5, a CD-ROM 4 and an output device 6, for example.

The body 2 of video game apparatus 1 comprises, for example, a controller 11, a RAM (random access memory) 12, an interface 13, a sound processor 14, a graphics processor 15, a CD-ROM (compact disk read only memory) drive 16 and a communication interface 17, which are mutually connected to each other via a bus 18. The CD-ROM 4 is loaded into and unloaded from the CD-ROM drive 16.

The controller 11 includes a CPU (central processing unit) and a ROM (read only memory) storing basic programs such as a boot program and an OS (operating system) and executes a program stored in the RAM 12 so as to implement processing for the progress of a game. The controller 11 controls operations of the foregoing sections 12 to 17 of the body 2.

The RAM 12 is used as a main memory of the body 2 and stores the program and data necessary for controlling the game progress transferred from the CD-ROM 4. The RAM 12 is also used as a work area upon execution of the program. Areas allocated to the RAM 12 and data stored therein will be described later in detail.

To the interface 13, the input device 3 and the memory card 5 are detachably connected. The interface 13 controls data exchange between the exterior components, i.e. the input device 3 and the memory card 5, and the interior components, i.e. the controller 11 and the RAM 12. The Input device 3 is provided with direction keys and various buttons. When a player operates those keys and buttons, commands necessary for controlling the progress of the game, such as moving commands or motion commands to a player character, are inputted. The memory card 5 is used for saving data indicative of the progress state of the game.

In response to a command from the controller 11, the sound processor 14 implements processing for reproducing sound data such as BGM (background music) and sound effect depending on the progress state of the game, and outputs a sound signal to the output device 6.

In response to a command from the controller 11, the graphics processor 15 implements three-dimensional graphic processing to produce image data according to the progress state of the game. The graphics processor 15 adds a predetermined synchronization signal to the produced image data and outputs a video signal to the output device 6.

In response to a command from the controller 11, the CD-ROM drive 16 drives the CD-ROM 4 loaded therein so as to transfer the program and data stored in the CD-ROM 4 to the RAM 12 via the bus 18.

The communication interface 17 is connected to an external network 100 via a communication cable 99 and, in response to a command from the controller 11, implements processing for data exchange with respect to the external network 100.

The CD-ROM 4 stores the program and data necessary for controlling the progress of the game. The CD-ROM 4 is driven by the CD-ROM drive 16 so that the stored program and data are read out. The program and data read from the CD-ROM 4 are transferred from the CD-ROM drive 16 to the RAM 12 via the bus 18.

The output device 6 comprises a display unit having a CRT (cathode ray tube) for displaying an image based on a video signal from the graphics processor 15, and a speaker for outputting a sound based on a sound signal from the sound processor 14. Normally, a television is used for the output device 6.

Now, the areas allocated to the RAM 12 and the data stored therein will be described in detail.

Figure 2:
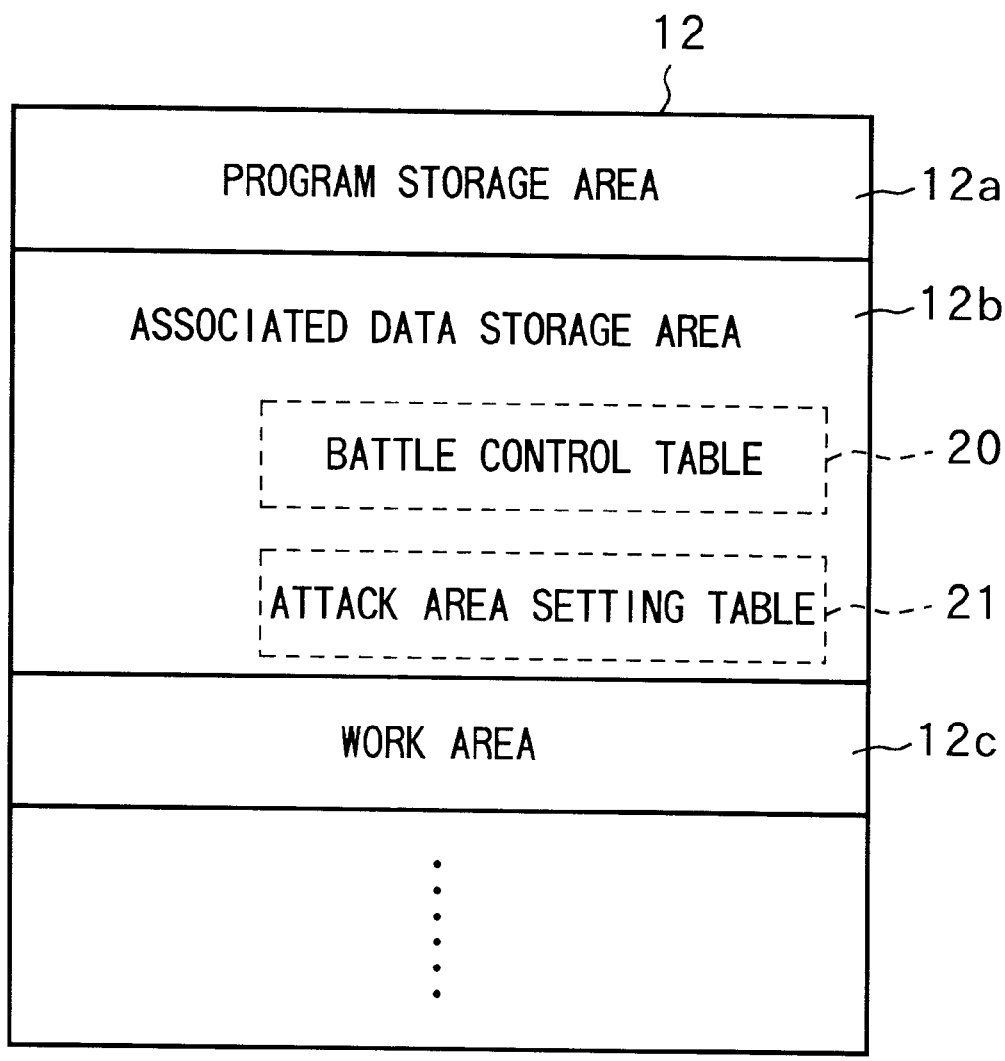
FIG. 2 is a schematic view showing areas allocated to a RAM shown in FIG. 1.

FIG. 2 is a schematic view showing the areas allocated to the RAM 12. As shown in FIG. 2, a program storage area 12a, an associated data storage area 12b and a work area 12c are allocated to the RAM 12. The program and data stored in those areas 12a to 12c are read from the CD-ROM 4 by the CD-ROM drive 16 and transferred to the RAM 12 under the control of the controller 11.

The program storage area 12a stores the program necessary for execution of the game, such as a program represented by a later-described flowchart.

The associated data storage area 12b stores various data for controlling a battle between a player character and enemy characters. Those data are stored in the form of a battle control table 20 and an attack area setting table 21.

The work area 12c successively stores other image data and sound data which become necessary during execution of the game.

FIG. 3 is a schematic view showing the battle control table 20 stored in the associated data storage area 12b. As shown in the figure, the battle control table 20 is provided with a column 20a for storing coordinate data of the player character, a column 20b for storing displayed enemy character data, and a column 20c for storing names of "area" items possessed by the player character.

Figures 4, 5:
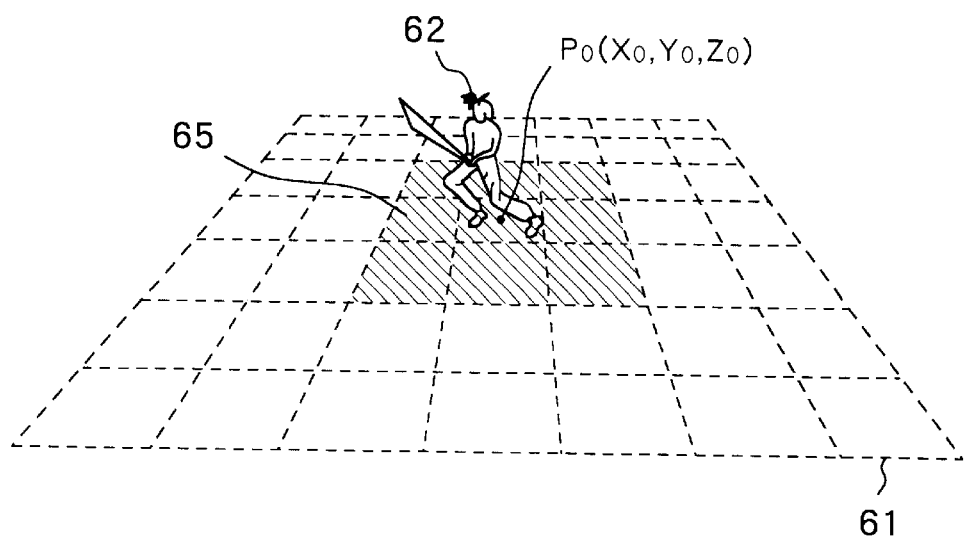
FIG. 4 is a schematic view of an attack area setting table stored in the associated data storage area of the RAM shown in FIG. 1.
FIG. 5 is a schematic view of an attack area when an "area" item is "fireball"

The player character coordinate data column 20a stores coordinate data representing a current position of the player character. Specifically, if, as shown in FIG. 5, coordinate data representing a current position of a player character 62 is "P0(X0,Y0,Z0)", "P0(X0,Y0,Z0)" is stored. This coordinate data is used as reference position data when setting an attack area.

The displayed enemy character data column 20b stores a name and three-dimensional coordinate data representing a current position of each of enemy characters displayed on a screen of the display unit of the output device 6. These data are used in a later-described area designation mode process for judging whether there are one or more enemy characters in an attack area.

The possessed "area" item column 20c stores names of "area" items currently possessed by the player character. When possessed by the player character, an "area" item allows the player to designate one or more enemy characters to be attacked in the area designation mode when the player character makes a magic attack corresponding to the possessed "area" item.

FIG. 4 is a schematic view showing the attack area setting table 21 stored in the associated data storage area 12b. As shown in the figure, the attack area setting table 21 is provided with a column 21a for storing names of magics, a column 21b for storing names of "area" items, and a column 21c for storing attack area data. The magic column 21a stores names of magic attacks which are executable by the player character in response to an operation inputted by the player. The "area" item column 21b stores names of "area" items corresponding to the respective magic attacks stored in the magic column 21a. The attack area data column 21c stores shape and size data of attack areas corresponding to the respective "area" items stored in the "area" item column 21b.

When one of the magic attacks stored in the magic column 21a is designated in accordance with an operation inputted by the player and a corresponding "area" item stored in the "area" item column 21b is possessed by the player character, corresponding attack area data is read from the attack area data column 21c so as to set an attack area.

For example, if the player designates a magic attack "fire" and the player character possesses a corresponding "area" item "fireball", the shape "square" and size "(3×3)" are read out as attack area data from the attack area setting table 21. Then, a display process is carried out based on the attack area data thus read out. As a result, as shown in FIG. 5, a square attack area 65 having the size of three unit squares by three unit squares (3×3) is set with respect to the coordinate data P0(X0,Y0,Z0) of the player character 62. In this case, the player character 62 can make an attack in the area designation mode wherein all enemy characters located within the attack area 65 are targets of the attack.

Figure 6:
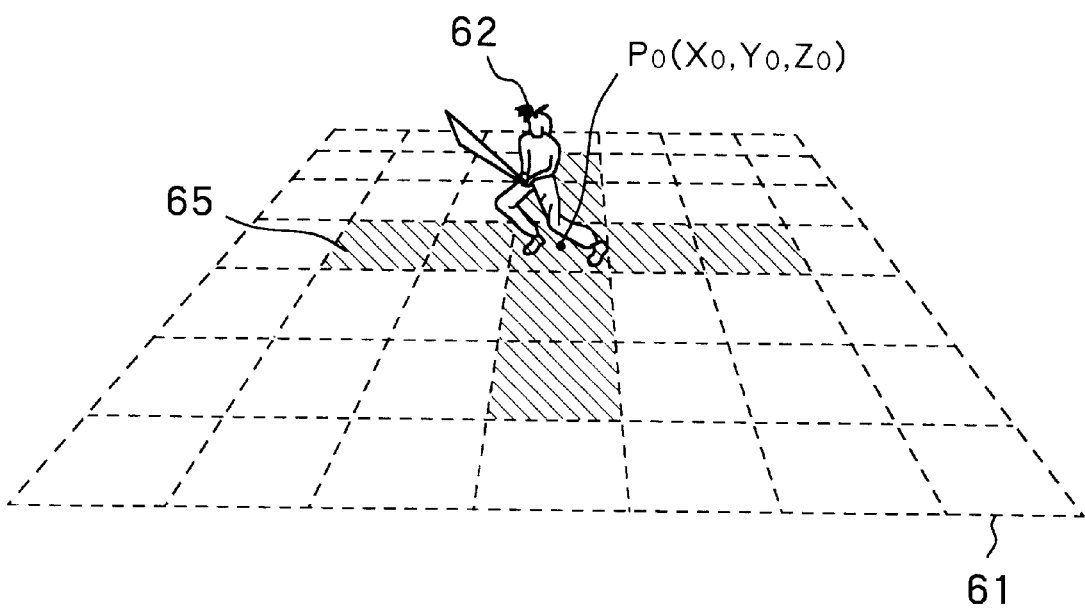
FIG. 6 is a schematic view of an attack area when an "area" item is "thunder cross"

Similarly, for example, if the player designates a magic attack "thunder" and the player character possesses a corresponding "area" item "thunder cross", the shape "cross" and size "(5×5)" are read out as attack area data from the attack area setting table 21. Then, a display process is carried out based on the attack area data thus read out. As a result, as shown in FIG. 6, a cross-shaped attack area 65 having the size of five unit squares by five unit squares (5×5) is set with respect to the coordinate data P0(X0,Y0,Z0) of the player character 62. Also in this case, the player character 62 can make an attack in the area designation mode wherein all enemy characters located within the attack area 65 are targets of the attack.

On the other hand, if the player character does not possess an "area" item corresponding to a designated magic attack, i.e. if "fireball" is not possessed when the magic attack "fire" is designated or if "thunder cross" is not possessed when the magic attack "thunder" is designated, the attack area data is not read out. Thus, an attack in the area designation mode can not be carried out. In this case, only a single enemy character is designated as an attack target using a cursor in a single enemy designation mode. The enemy character designation according to the area designation mode and the single enemy designation mode will be described later in detail with reference to flowcharts.

The player character can obtain "area" items in the following cases:

(1) The number of times of having used a weapon or armor item reaches a predetermined value so that the weapon or armor item is broken to be an "area" item;

(2) An "area" item is given to the player character when a particular event is cleared;

(3) The player operates the player character to pick up an "area" item arranged at a predetermined position on a field area 61.

Now, the processing executed by the controller 11 in the video game apparatus 1 will be described. Upon starting up the body 2, the OS stored in the ROM and the program (game program) and data stored in the CD-ROM 4 for execution of the game are read into the areas 12a to 12c of the RAM 12 according to the boot program stored in the ROM.

Figure 7:
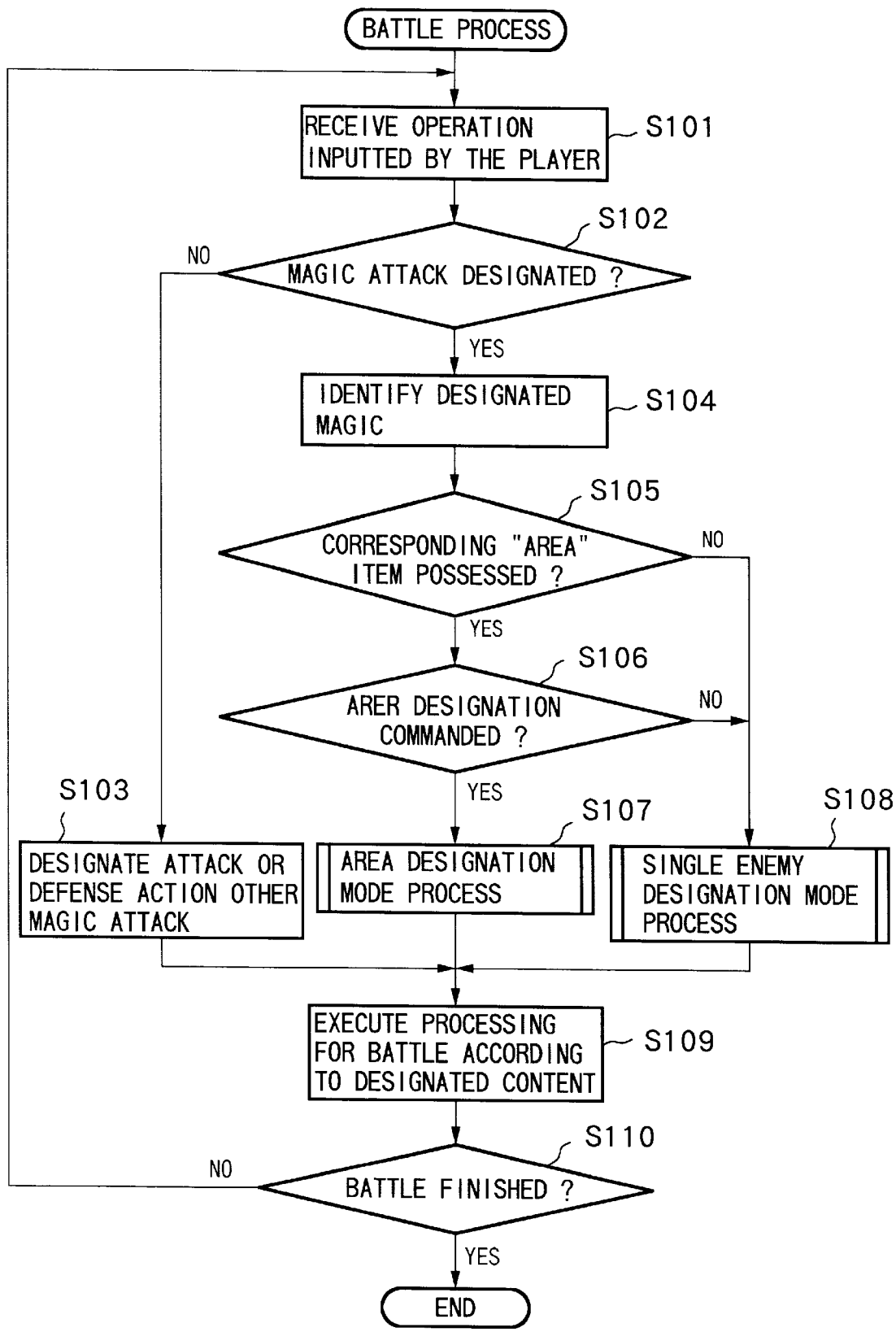
FIG. 7 is a flowchart showing a battle process.

Thereafter, the processing for execution of the game is started according to the game program, wherein when a battle state between a player character and an enemy character is detected, the controller 11 executes a battle process represented by a flowchart shown in FIG. 7. The battle process will be described in detail hereinbelow. Control operations executed in the video game apparatus 1 include those operations which are actually controlled by cooperation between the controller 11 and other circuits. However, for brevity of description, the following explanation will be given assuming that all operations relating to the controller 11 are directly controlled by the controller 11.

As shown in FIG. 7, when the battle process is started, the controller 11 first monitors receipt of an operation inputted by the player via the input device 3 (step S101). Then, it is judged based on the received operation input whether a magic attack is designated (step S102). If no magic attack is designated, the controller 11 designates an attack or defense action other than a magic attack (step S103). Then, processing for a battle between the player character and an enemy character designated as an attack target is executed according to the designated content, wherein damages are calculated and images and sounds for the battle are produced (step S109).

On the other hand, if the magic attack is designated at step S102, a name of a designated magic is identified according to the operation inputted by the player (step S104). Then, the attack area setting table 21 is first referred to so as to identify a name of an "area" item corresponding to the designated magic. Subsequently, the battle control table 20 is referred to so as to judge whether the identified "area" item is possessed by the player character (step S105).

If the identified "area" item is possessed by the player character, it is judged whether there is a command from the player to attack in the area designation mode (step S106). If the identified "area" item is possessed by the player character and there is such a command from the player, the area designation mode process is executed (step S107). In the area designation mode process, an attack area is displayed and one or more enemy characters within such an attack area are designated as attack targets, which will be described later in detail.

On the other hand, if the player character does not possess the "area" item corresponding to the designated magic attack at step S105, or if there is no command to attack in the area designation mode even when such an "area" item is possessed by the player character, the single enemy designation mode process is executed (step S108).

In the single enemy designation mode process, only a single enemy character is designated as an attack target using a cursor, which will be described later in detail.

Then at step S109 following step S103, S107 or S108, the processing for a battle is carried out according to the designated content as described above. Thereafter, it is judged whether the battle is finished (step S110). Execution of steps S101 through S109 is repeated until the battle is finished. Then, when all enemy characters in the battle are defeated or the player character is defeated, step S110 judges that the battle is finished, so that the battle process is terminated.

Figure 8:
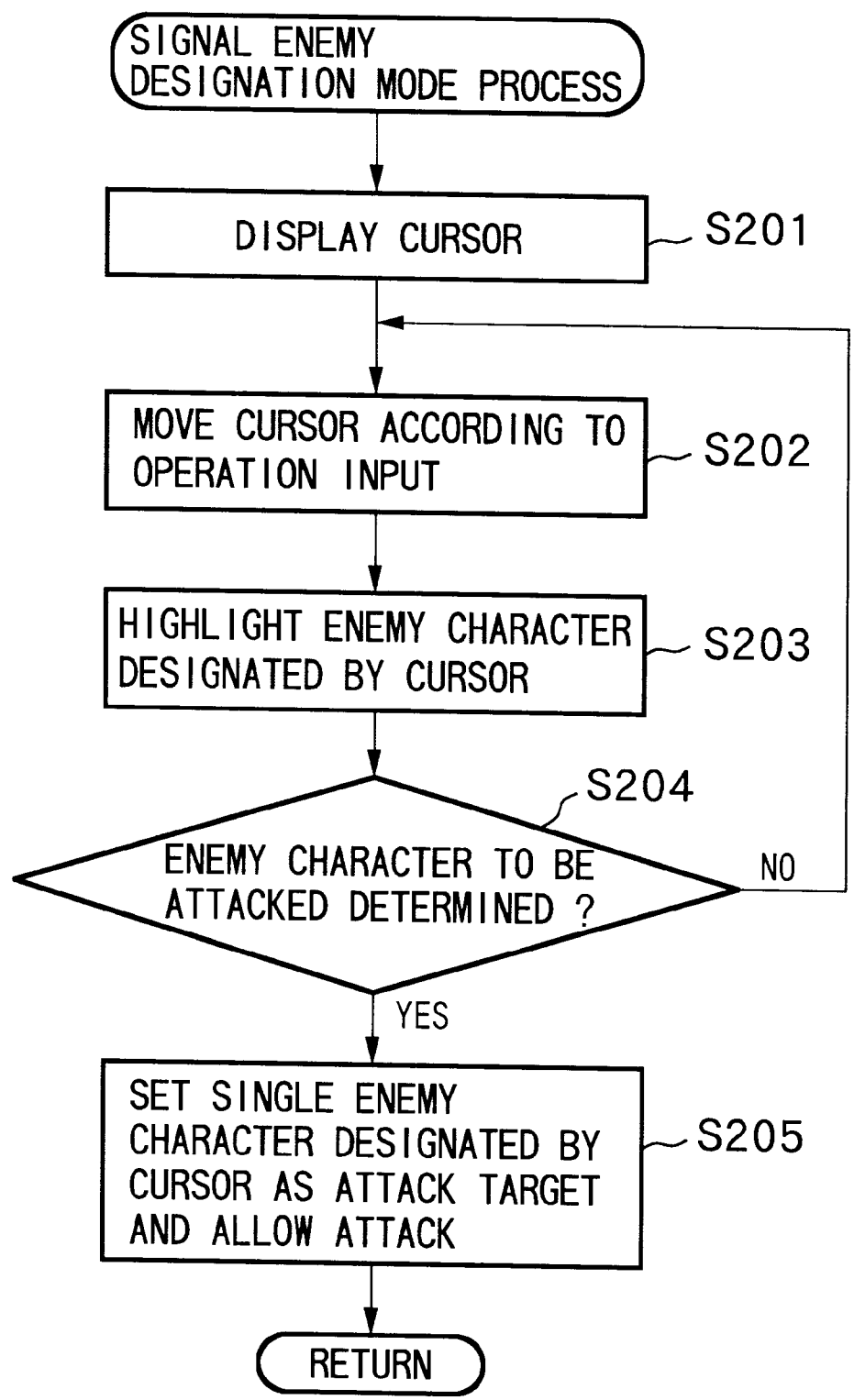
FIG. 8 is a flowchart showing a single enemy designation mode process.

FIG. 8 is a flowchart for explaining in detail the single enemy designation mode process executed at step S108 in FIG. 7.

Figure 9:
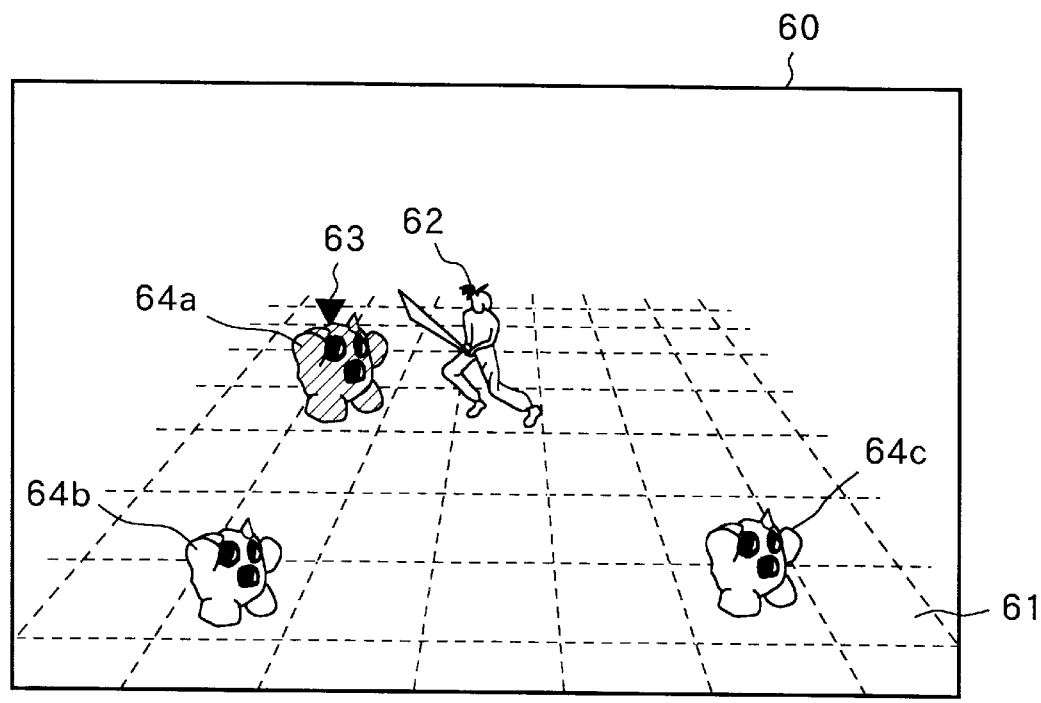
FIGS. 9 and 10 are schematic views of a display transition example in the single enemy designation mode.
Figure 10:
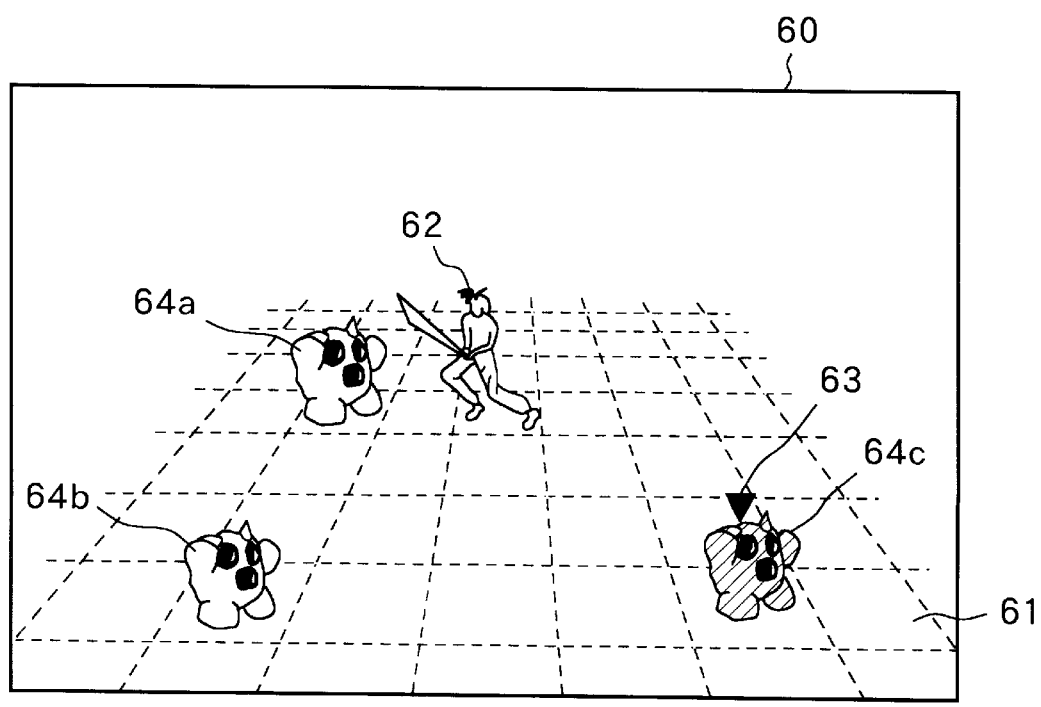

As shown in FIG. 8, processing for displaying a cursor is first carried out (step S201). Thus, as shown in FIG. 9, a cursor 63 is displayed on a screen 60 of the output device 6. Then, the cursor 63 is moved on the screen 60 according to an operation inputted by the player via the input device 3 (step S202). Thus, as shown in FIG. 10, the cursor 63 is moved to a position determined by the operation input via the input device 3.

An enemy character designated by the cursor is highlighted (step S203). Specifically, as shown by hatching in FIG. 9 or 10, an enemy character 64a or 64c designated by the cursor is on-and-off displayed in red. Thus, an enemy character to be an attack target is made clear visually.

Subsequently, it is judged whether a determining operation for determining an enemy character to be attacked is carried out by the player (step S204). Until the determining operation is performed, execution of steps S202 to S204 is repeated. If the determining operation is performed, the single enemy character designated by the cursor 63 is set as an attack target and allowed to be attacked (step S205).

Accordingly, in the single enemy designation mode, only a single enemy character designated by the cursor becomes an attack target. Specifically, if the determining operation is carried out in the state shown in FIG. 9, the enemy character 64a becomes an attack target and, if the determining operation is carried out in the state shown in FIG. 10, the enemy character 64c becomes an attack target. Then, the processing for a battle between the player character 62 and the enemy character 64a or 64c being the attack target is executed at step S109 in FIG. 7.

Figure 11:
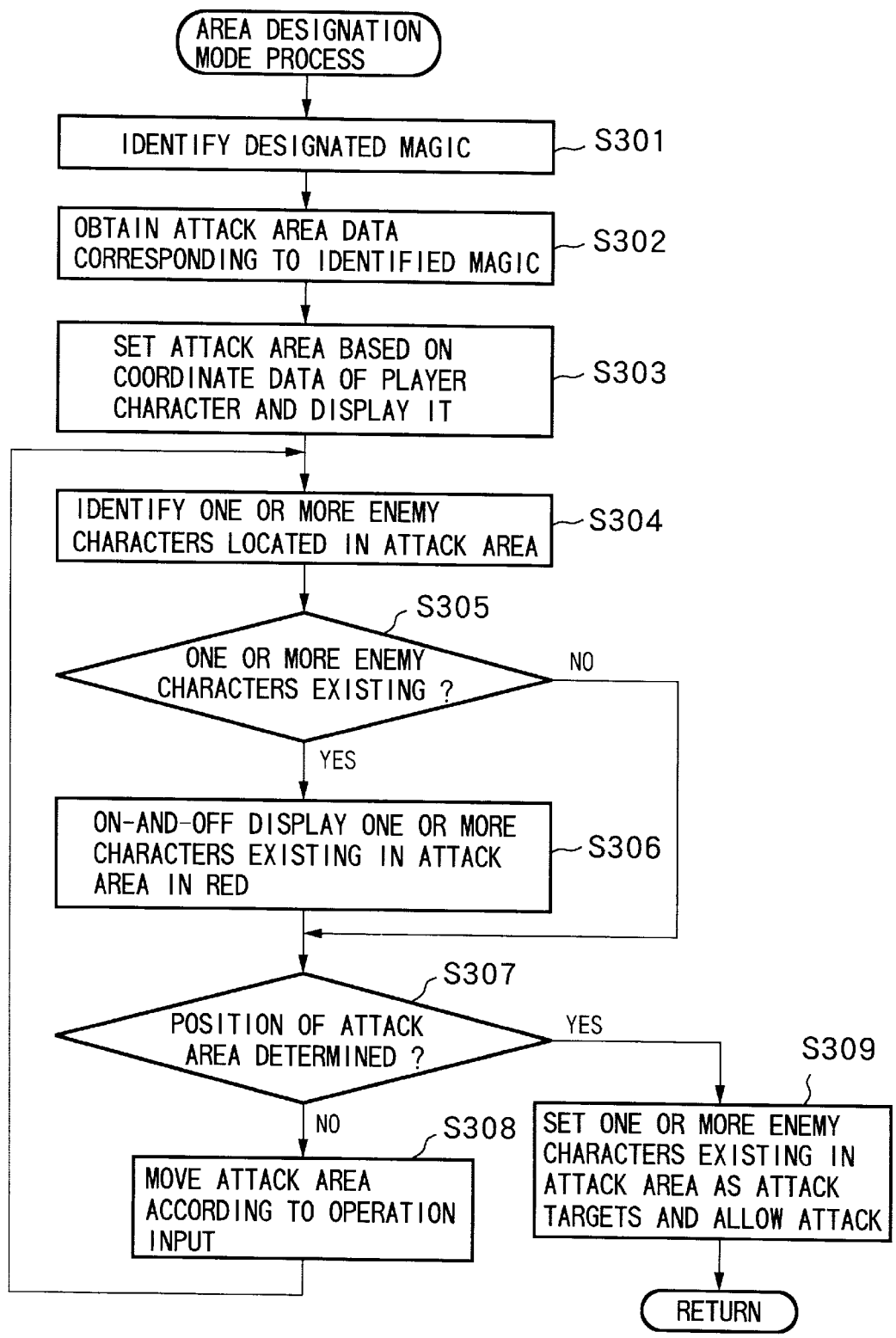
FIG. 11 is a flowchart showing an area designation mode process.

FIG. 11 is a flowchart for explaining in detail the area designation mode process executed at step S107 in FIG. 7.

As shown in FIG. 11, the designated magic is first identified (step S301). Then, referring to the attack area setting table 21, attack area data corresponding to the identified magic is obtained (step S302). Specifically, as shown in FIG. 4, if the identified magic is "thunder", the shape "cross" and size "(5×5)" are obtained as attack area data.

Figure 12:
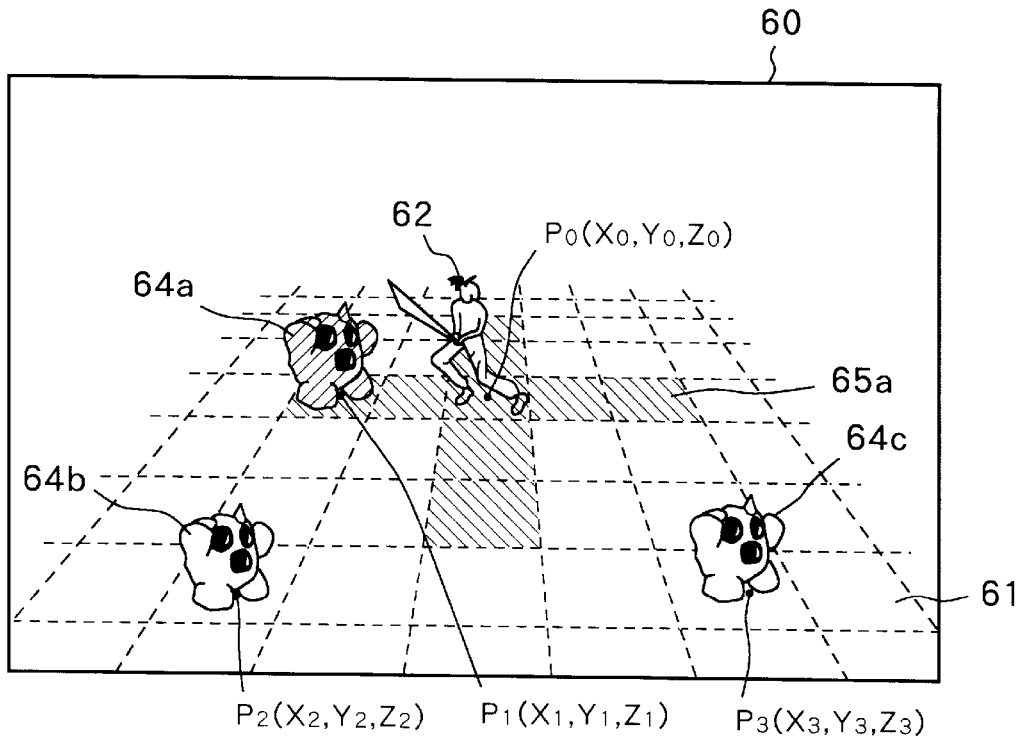
FIGS. 12 and 13 are schematic views of a display transition example in the area designation mode.

Subsequently, coordinate data of the player character is obtained from the battle control table 20, and an attack area is set based on the obtained coordinate data of the player character and the attack area data obtained at step S302 and displayed (step S303). For example, as shown in FIG. 3, it is assumed that "P0(X0,Y0,Z0)" is stored as the coordinate data of the player character and that the shape "cross" and size "(5×5)" are obtained as the attack area data at step S302. Then, as shown in FIG. 12, a cross-shaped attack area 65a having the size of (5×5) is set with respect to a point corresponding to he coordinate data "P0(X0,Y0,Z0)" of the player character and displayed on the screen 60.

Then, one or more enemy characters located within the attack area are identified (step S304). Specifically, since the shape and size of the attack area 65a shown in FIG. 12 and the coordinate data "P0(X0,Y0,Z0)" of the center of the attack area 65a are obtained, it is possible to identify coordinate data in the attack area 65a. Further, coordinate data "P1(X1,Y1,Z1)", "P2(X2,Y2,Z2)" and "P3(X3,Y3,Z3)" of enemy characters can be obtained from the battle control table 20. Thus, by judging whether the coordinate data of each of the enemy characters is located within the attack area 65a, it is possible to identify one or more enemy characters located within the attack area 65a.

Then, it is confirmed based on a result of the identification at step S304 whether there exist one or more enemy characters within the attack area (step S305). If one or more enemy characters exist in the attack area, such one or more enemy characters are on-and-off displayed in red (step S306). Thus, as shown by hatching in FIG. 12, the enemy character 64a existing in the attack area 65a is on-and-off displayed in red.

Then, it is judged whether a determining operation for determining a position of an attack area is carried out by the player via the input device 3 (step S307). If such a determining operation is not performed, an attack area is moved along the unit squares in accordance with an operation of the direction keys of the input device 3 (step S308).

Figure 13:
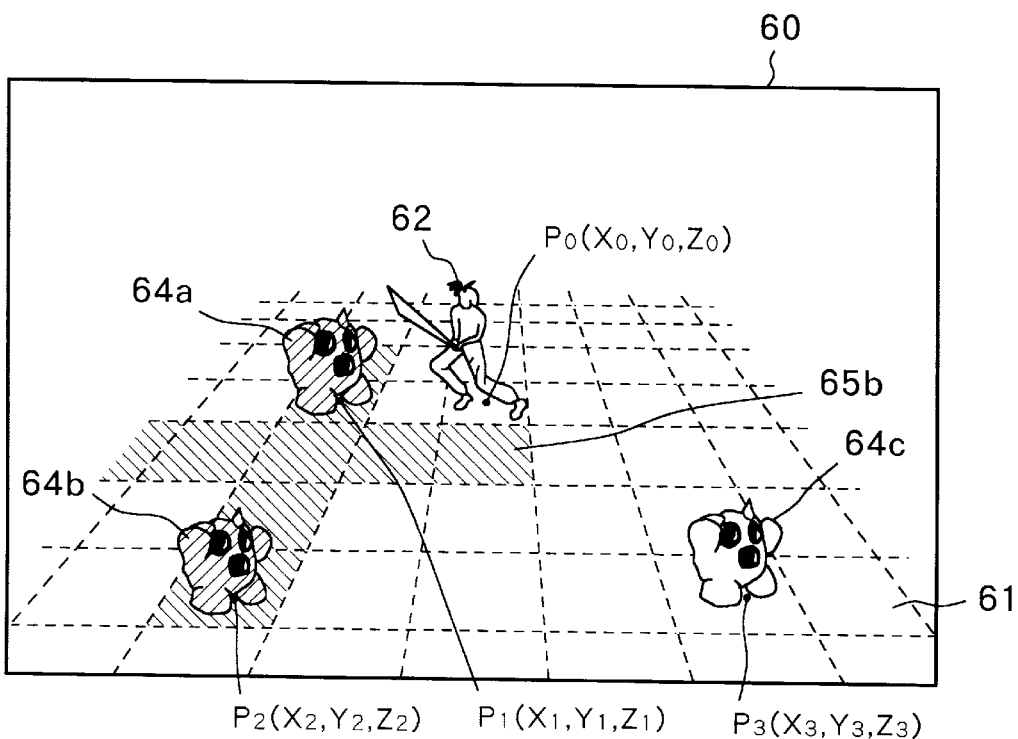

Accordingly, if the player operates the direction keys of the input device 3 in the state where the attack area 65a is displayed as shown in FIG. 12, the attack area 65a is moved along the unit squares and changed to an attack area 65b as shown in FIG. 13, i.e. the position of the attack area is displaced.

After execution of step S308, execution of step S304 and subsequent steps is repeated. Accordingly, step S306 is now executed in the state shown in FIG. 13 so that the enemy characters 64a and 64b are on-and-off displayed in red.

On the other hand, if the position of the attack area is determined at step S307, one or more enemy characters existing in the attack area are set as attack targets and allowed to be attacked (step S309).

Therefore, if the position of the attack area is determined in the state shown in FIG. 12, only the enemy character 64a existing in the attack area 65a is set as an attack target so that the player character 62 can make an attack only to the enemy character 64a. On the other hand, if the position of the attack area is determined in the state shown in FIG. 13, the enemy characters 64a and 64b existing in the attack area 65b are set as attack targets so that the player character 62 can make an attack against the enemy characters 64a and 64b.

As described above, according to the video game apparatus 1 in this embodiment, step S105 judges whether the player character possesses an "area" item corresponding to a magic attack designated by an operation inputted by the player. Then, only when the player character possesses such an "area" item, the area designation mode process is executed. Thus, depending on whether the player character possesses an "area" item corresponding to a designated mac attack, the designation manner of one or more enemy characters can be changed between the single enemy designation mode and the area designation mode.

Further, the attack area setting table 21 stores different shape and size data about attack areas for the respective magic attacks, and steps S302 and S303 obtain attack area data corresponding to a designated magic attack and set a corresponding attack area. Thus, the shape and size of an attack area differ depending on a magic attack designated by the player. Accordingly, for example, the player designates a magic attack in consideration of positions of enemy characters so as to effectively designate as many enemy characters as possible. This enhances the attractiveness of the game from a strategic aspect. Further, the attack area can be moved through execution of step S308.

In the foregoing preferred embodiment, the present invention is realized using the home-use game apparatus as a platform. However, the present invention may also be realized using a personal computer or an arcade game apparatus as a platform.

In the foregoing preferred embodiment, the program and data for realizing the present invention are stored in a CD-ROM, and the CD-ROM is used as a storage medium. However, a storage medium is not limited to a CD-ROM, but may be a computer-readable magnetic or optical storage medium or semiconductor memory other than the CD-ROM. Further, the program and data for realizing the present invention may be preinstalled in a storage of a game apparatus or computer.

The program and data for realizing the present invention may be downloaded from another device on the network 100 connected via the communication cable 99, using the communication interface 17 shown in FIG. 1. On the other hand, the program and data for realizing the present invention may be stored in a storage of another device on the communication cable 99 and transferred to the RAM 12 via the communication interface 17 upon using them.

Further, the program and data for realizing the present invention may be provided as a computer data signal embodied in a carrier wave from another device on the network 100. In this case, transmission of the computer data signal is requested to the device on the network 100 from the communication interface 17 via the communication cable 99 so that the transmitted computer data signal is received and stored in the RAM 12. It is possible to realize the present invention by the video game apparatus 1 using the program and data thus stored in the RAM 12.

While the present invention has been described in terms of the preferred embodiment, the invention is not to be limited thereto, but can be embodied in various ways without departing from the principle of the invention as defined in the appended claims.

What is claimed is:

1. A video game apparatus for playing a video game wherein a battle is made between a first and a second character, said apparatus comprising:

storage means for storing an item and an attack area corresponding to each of attacks executable by said first character;

detecting means for, when one of said attacks is designated in response to an operation inputted by a player, detecting whether said first character possesses one of said items which is stored in said storage means so as to correspond to said designated attack;

area displaying means for, when said detecting means detects that said first character possesses said one of said items, displaying one of said attack areas which is stored in said storage means so as to correspond to said designated attack; and attack allowing means for allowing said first character to attack said second character when said second character is located in said one of said attack areas displayed by said area displaying means.

2. The video game apparatus according to claim 1, wherein said area displaying means moves a display position of said one of said attack areas in response to an operation inputted by the player.

3. A video game apparatus for playing a video game wherein a battle occurs between characters, said apparatus comprising:

a display that displays an image showing a battle state between said characters in response to a first operation input by a player;

a display that displays an attack area, corresponding to an attack designated by said first player operation, on said displayed image;

an attack area mover that moves said attack area following a predetermined rule in response to a second operation input by the player;

a display manner changer that changes a display manner of said at least one of said characters, when at least one of said characters is located in said attack area, and a target character specifier that specifies as an attack target said at least one of said characters whose display manner is changed.

4. A method of playing a video game wherein a battle is made between a first and a second character, said method comprising:

a detecting step for, when an attack to be made by said first character is designated in response to an operation inputted by a player, detecting whether said first character possesses an item which is stored in advance corresponding to said designated attack;

an area displaying step for, when said detecting step detects that said first character possesses said item, displaying an attack area which is stored in advance corresponding to said designated attack; and an attack allowing step for allowing said first character to attack said second character when said second character is located in said attack area displayed at said area displaying step.

5. The method according to claim 4, wherein said area displaying step moves a display position of said attack area in response to an operation inputted by the player.

6. A method of playing a video game wherein a battle occurs between characters, said method comprising:

displaying an image showing a battle state between said characters in response to a first operation input by a player;

displaying an attack area, corresponding to an attack designated by said first player operation, on said displayed image;

moving said attack area following a predetermined rule in response to a second operation input by the player;

changing a display manner of said at least one of said characters, when at least one of said characters is located in said attack area; and specifying as an attack target said at least one of said characters whose display manner is changed.

7. A computer-readable storage medium storing a program for causing a computer to execute a video game wherein a battle is made between a first and a second character, said program comprising:

a detecting step for, when an attack to be made by said first character is designated in response to an operation inputted by a player, detecting whether said first character possesses an item which is stored in advance corresponding to said designated attack;

an area displaying step for, when said detecting step detects that said first character possesses said item, displaying an attack area which is stored in advance corresponding to said designated attack; and an attack allowing step for allowing said first character to attack said second character when said second character is located in said attack area displayed at said area displaying step.

8. The computer-readable storage medium according to claim 7, wherein said area displaying step moves a display position of said attack area in response to an operation inputted by the player.

9. A computer-readable storage medium storing a program for causing a computer to execute a video game wherein a battle occurs between characters, said program comprising:

displaying an image showing a battle state between said characters in response to a first operation input by a player;

displaying an attack area, corresponding to an attack designated by said first player operation, on said displayed image;

moving said attack area following a predetermined rule in response to a second operation input by the player;

changing a display manner of said at least one of said characters, when at least one of said characters is located in said attack area; and specifying as an attack target said at least one of said characters whose display manner is changed.

10. A computer data signal embodied in a carrier wave and including a program for causing a computer to execute a video game wherein a battle is made between a first and a second character, said computer data signal comprising:

a detecting step for, when an attack to be made by said first character is designated in response to an operation inputted by a player, detecting whether said first character possesses an item which is stored in advance corresponding to said designated attack;

an area displaying step for, when said detecting step detects that said first character possesses said item, displaying an attack area which is stored in advance corresponding to said designated attack; and an attack allowing step for allowing said first character to attack said second character when said second character is located in said attack area displayed at said area displaying step.

11. A game apparatus for playing a video game in which a battle occurs between a first character and a second character, the apparatus comprising:

a storage area that stores a plurality of attacks, which are executable by the first character, a plurality of items, which correspond to the plurality of attacks, and a plurality of attack areas, which correspond to the plurality of attacks;

a detector that detects whether the first character possesses an item corresponding to the designated attack when one of the attacks is designated in response to a first input operation by a player;

a display that displays an attack area corresponding to the designated attack when the detector detects that the first character possesses the corresponding item; and an attack allowing system that allows the first character to attack the second character when the second character is located in the attack area displayed by the display.

12. The video game apparatus according to claim 11, wherein the display moves a display position of the attack area in response to a second input operation by the player.

13. A video game apparatus for playing a video game in which a battle occurs between characters, the apparatus comprising:

an image display system that shows a battle state between the characters in response to a first operation input by a player;

an attack area display system that displays an attack area, corresponding to a player designated attack, on the displayed image;

a movement system that moves the attack area following a predetermined rule in response to a second operation input by the player;

a system that changes a display manner of a character when the character is located in the attack area; and a targeting system that specifies as an attack target the character whose display manner is changed.

14. A method of playing a video game in which a battle occurs between a first character and a second character, the method comprising:

when an attack to be made by the first character is designated in response to a first operation input by a player, detecting whether the first character possesses an item corresponding to the designated attack;

displaying an attack area, corresponding to the designated attack, when the detecting detects that the first character possesses the item; and allowing the first character to attack the second character when the second character is located in the displayed attack area.

15. The method according to claim 14, wherein the area displaying further comprises moving a display position of the attack area in response to a second operation input by the player.

16. A method of playing a video game in which a battle occurs between characters, the method comprising:

displaying an image showing a battle state between the characters in response to a first operation input by a player;

displaying an attack area, corresponding to a player designated attack, on the displayed image;

moving the attack area following a predetermined rule in response to a second operation input by the player;

when at least one of the characters is located in the attack area, changing a display manner of the at least one character; and specifying as an attack target the at least one character whose display manner is changed.

17. A computer-readable storage medium storing a program for causing a computer to execute a video game in which a battle occurs between a first character and a second character, the program comprising:

when an attack to be made by the first character is designated in response to a first operation input by a player, detecting whether the first character possesses an item corresponding to the designated attack;

displaying an attack area corresponding to the designated attack, when the detecting detects that the first character possesses the item; and allowing the first character to attack the second character when the second character is located in the displayed attack area.

18. The computer-readable storage medium according to claim 17, wherein the area displaying further comprises moving a display position of the attack area in response to a second operation input by the player.

19. A computer-readable storage medium storing a program for causing a computer to execute a video game in which a battle occurs between characters, the program comprising:

displaying an image showing a battle state between the characters in response to a first operation input by a player;

displaying an attack area, corresponding to a player designated attack, on the displayed image;

moving the attack area following a predetermined rule in response to a second operation input by the player;

when at least one of the characters is located in the attack area, changing a display manner of the at least one character; and specifying as an attack target the at least one character whose display manner is changed.

20. A computer data signal embodied in a carrier wave and controlled by a program for causing a computer to execute a video game in which a battle occurs between a first character and a second character, the computer data signal comprising:

when an attack to be made by the first character is designated in response to a first operation input by a player, detecting whether the first character possesses an item corresponding to the designated attack;

displaying an attack area corresponding to the designated attack, when the detecting detects that the first character possesses the item; and allowing the first character to attack the second character when the second character is located in the displayed attack area.

* * * * *